(12) United States Patent
Takizawa et al.

(10) Patent No.: US 9,523,880 B2
(45) Date of Patent: Dec. 20, 2016

(54) TRANSPARENT CONDUCTIVE FILM, AND TOUCH PANEL AND DISPLAY DEVICE HAVING THE SAME

(71) Applicant: Toppan Printing Co., Ltd., Taito-ku (JP)

(72) Inventors: Seiji Takizawa, Taito-ku (JP); Yutaka Ito, Taito-ku (JP)

(73) Assignee: TOPPAN PRINTING CO., LTD., Taito-ku (JP)

( * ) Notice: Subject to any disclaimer, the term of this patent is extended or adjusted under 35 U.S.C. 154(b) by 0 days.

(21) Appl. No.: 14/829,242

(22) Filed: Aug. 18, 2015

(65) Prior Publication Data
US 2015/0355489 A1 Dec. 10, 2015

Related U.S. Application Data

(63) Continuation of application No. PCT/JP2014/000804, filed on Feb. 17, 2014.

(30) Foreign Application Priority Data

Feb. 20, 2013 (JP) ................................ 2013-031090

(51) Int. Cl.
*G02F 1/1333* (2006.01)
*G02B 5/30* (2006.01)
(Continued)

(52) U.S. Cl.
CPC .............. *G02F 1/13338* (2013.01); *B32B 5/14* (2013.01); *B32B 7/02* (2013.01); *G02B 5/3083* (2013.01);
(Continued)

(58) Field of Classification Search
None
See application file for complete search history.

(56) References Cited

U.S. PATENT DOCUMENTS 6,380,480 B1 * 4/2002 Norimatsu ........ H01L 31/02162
136/249

FOREIGN PATENT DOCUMENTS

JP 2001-036117 A 2/2001
JP 2005-029463 A 2/2005
(Continued)

OTHER PUBLICATIONS

International Search Report issued May 13, 2014 in PCT/JP2014/000804, filed Feb. 17, 2014.

*Primary Examiner* — Tahseen N Khan
(74) *Attorney, Agent, or Firm* — Oblon, McClelland, Maier & Neustadt, L.L.P.

(57) ABSTRACT

A transparent conductive film includes a transparent substrate, an undercoat layer, and a transparent conductive layer. The undercoat layer has a refractive index of from 1.5 to 2.0, which is higher than a refractive index of the transparent substrate and lower than a refractive index of the transparent conductive layer. The undercoat layer includes a refractive material having a refractive index of 2.0 or greater in an amount of 40 wt. % or less. The undercoat layer satisfies:

$$X(\text{Si}30)/X(\text{C}30) \geq 0.28 \quad (1)$$

$$X(\text{Si}40)/X(\text{C}40) \leq 0.23 \quad (2)$$

where X (Si30) and X (C30) are silicon and carbon atom contents in a portion of 30 nm or less in thickness from the transparent conductive layer. X (Si40) and X (C40) are silicon and carbon atom contents in a portion of 40 nm or more in thickness from the transparent conductive layer.

20 Claims, 4 Drawing Sheets

(51) Int. Cl.
*B32B 7/02* (2006.01)
*B32B 5/14* (2006.01)
*G06F 3/041* (2006.01)

(52) U.S. Cl.
CPC ......... *G06F 3/041* (2013.01); *B32B 2457/202* (2013.01); *B32B 2457/208* (2013.01); *Y10T 428/24942* (2015.01)

(56) References Cited

FOREIGN PATENT DOCUMENTS

JP     2008-007610 A     1/2008
WO    WO 2008/114627 A1  9/2008

\* cited by examiner

TRANSPARENT CONDUCTIVE FILM, AND TOUCH PANEL AND DISPLAY DEVICE HAVING THE SAME

The present application is a continuation of International Application No. PCT/JP2014/000804, filed Feb. 17, 2014, which is based upon and claims the benefits of priority to Japanese Application No. 2013-031090, filed Feb. 20, 2013. The entire contents of these applications are incorporated herein by reference.

BACKGROUND OF THE INVENTION

1. Field of the Invention

The present invention relates to a display device which uses a touch panel as an input device.

2. Discussion of the Background

In recent years, transparent touch panels that allow a user to provide input by simply touching a display screen with his/her finger or pressing it by a pen have become widely used. Such touch panels use a transparent conductive film as an electrode which is generally made up of a glass or polymer film and a conductive film laminated thereon. Recently, a polymer film such as polyethylene terephthalate is used for the transparent conductive film due to its high flexibility and workability, and light weight.

During the manufacturing process of the touch panel, the transparent conductive film is patterned to form a portion having a transparent conductive layer and a portion not having a transparent conductive layer, thereby providing an electrode wiring of the touch panel. This pattern is required, as a property of the transparent conductive film, not to be easily seen by visual observation.

In order to provide a pattern with invisibility for the transparent conductive film, an optical adjustment layer having high refractive index is typically disposed between the transparent conductive layer and the substrate.

SUMMARY OF THE INVENTION

According to one aspect of the present invention, a transparent conductive film includes a transparent substrate, an undercoat layer formed on the transparent substrate, and a transparent conductive layer formed on the undercoat layer. The undercoat layer has a refractive index in a range of from 1.5 to 2.0, which is higher than a refractive index of the transparent substrate and lower than a refractive index of the transparent conductive layer. The undercoat layer is made of a composition including a refractive material having a refractive index of 2.0 or greater in an amount of 40 wt. % or less with respect to a total amount of the composition of the undercoat layer. The undercoat layer includes a silicon atom and a carbon atom and satisfies formulas (1) and (2):

$$X(Si30)/X(C30) \geq 0.28 \quad (1)$$

$$X(Si40)/X(C40) \leq 0.23 \quad (2)$$

where $X(Si30)$ and $X(C30)$ are a silicon atom content and a carbon atom content in % in the undercoat layer in a portion of 30 nm or less in thickness from the transparent conductive layer, and $X(Si40)$ and $X(C40)$ are a silicon atom content and a carbon atom content in % in the undercoat layer in a portion of 40 nm or more in thickness from the transparent conductive layer.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

With reference to the drawings, an embodiment for implementing the present invention will be described. It should be noted that the present invention is not limited to the following embodiment. Design modifications can be made on the basis of the knowledge of the person skilled in the art, and such modifications are also included in the scope of the present invention.

Figure 1:
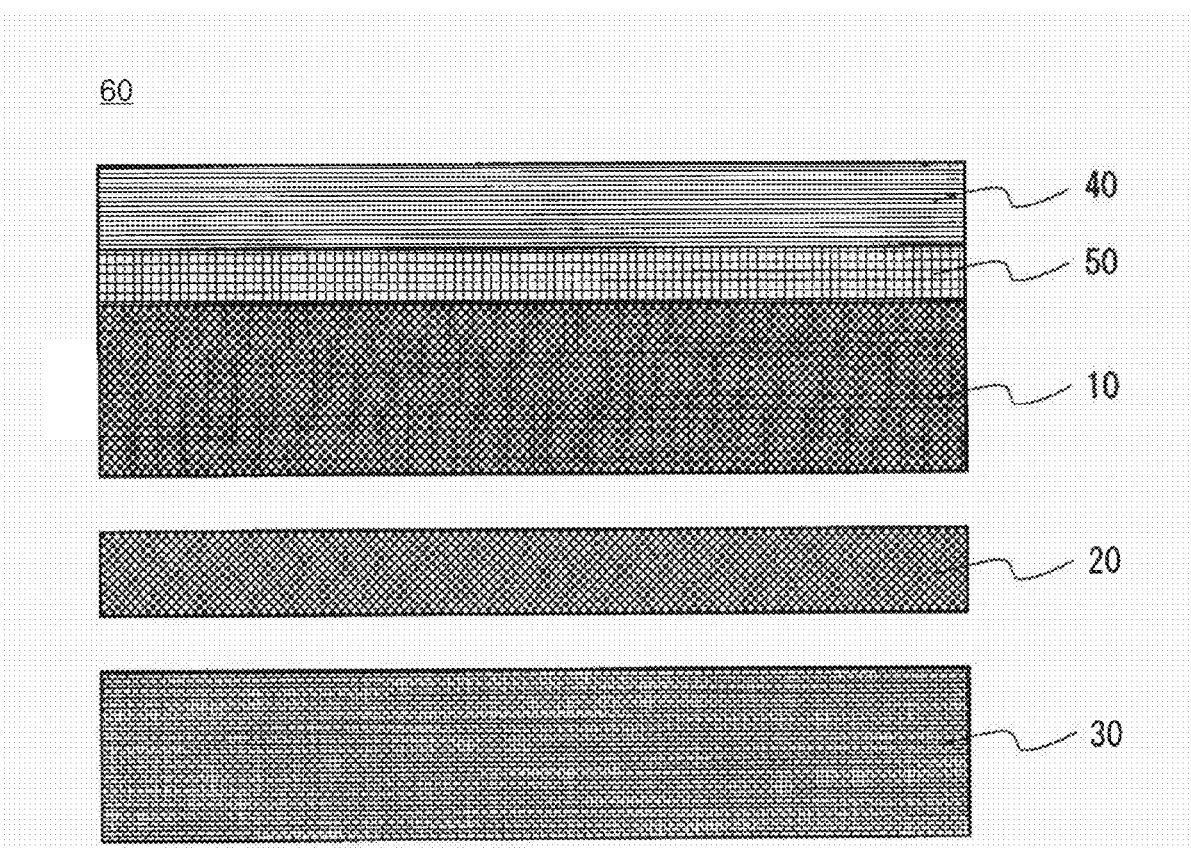
FIG. 1 shows one embodiment of the present invention and is a cross sectional view of a display device having a touch panel.

FIG. 1 is a cross sectional view which shows a configuration of a display device 60 having a touch panel according to the present embodiment. The display device 60 having the touch panel shown in FIG. 1 includes an LCD display panel 30, a touch panel 10 disposed on an observation side, a front panel layer 40 disposed on a surface of the observation side of the touch panel 10 via an adhesive layer 50, and a shield layer 20 interposed between the LCD display panel 30 and the touch panel 10. The shield layer 20 may be separated from the touch panel 10 as shown in FIG. 1, or alternatively, may be bonded to the touch panel 10 via an adhesive or the like.

Figure 2:
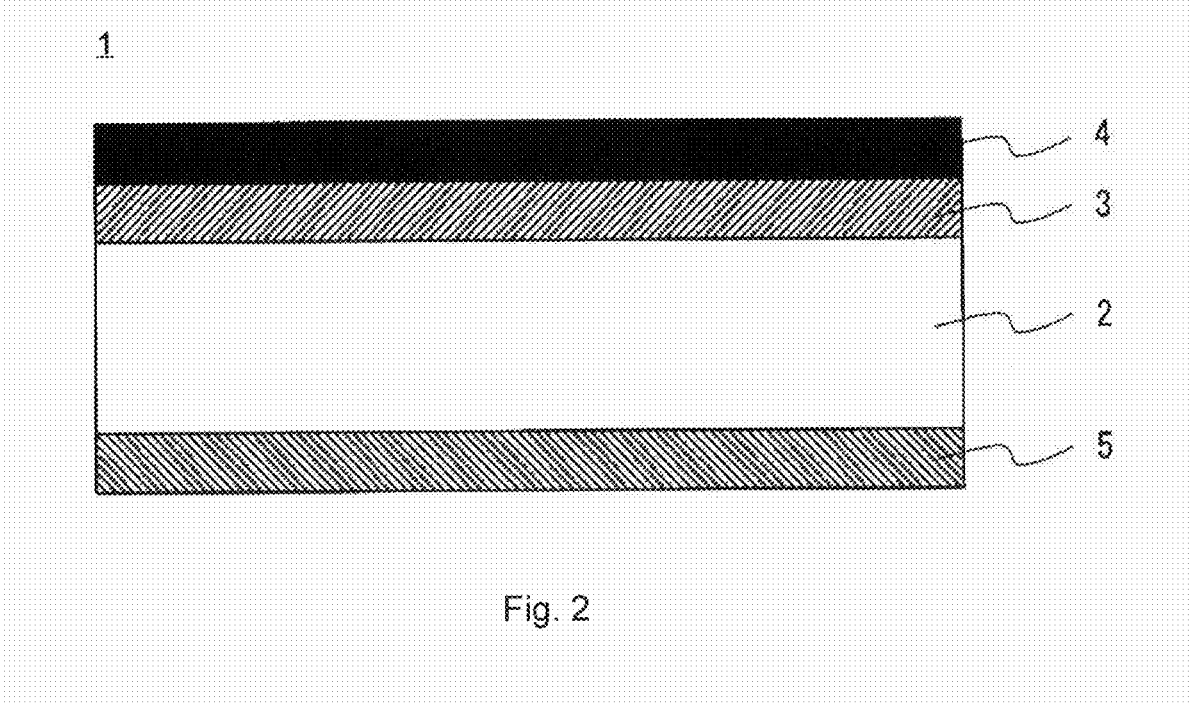
FIG. 2 shows one embodiment of the present invention and is a cross sectional view of a transparent conductive film.

FIG. 2 is a cross sectional view which shows a configuration of the transparent conductive film 1 which is used for the touch panel 10 according to the present embodiment. An undercoat layer 3 and a transparent conductive layer 4 are laminated in sequence on one surface of the transparent substrate 2, and a transparent thin film layer 5 is disposed on the other surface of the transparent substrate 2.

Figure 3:
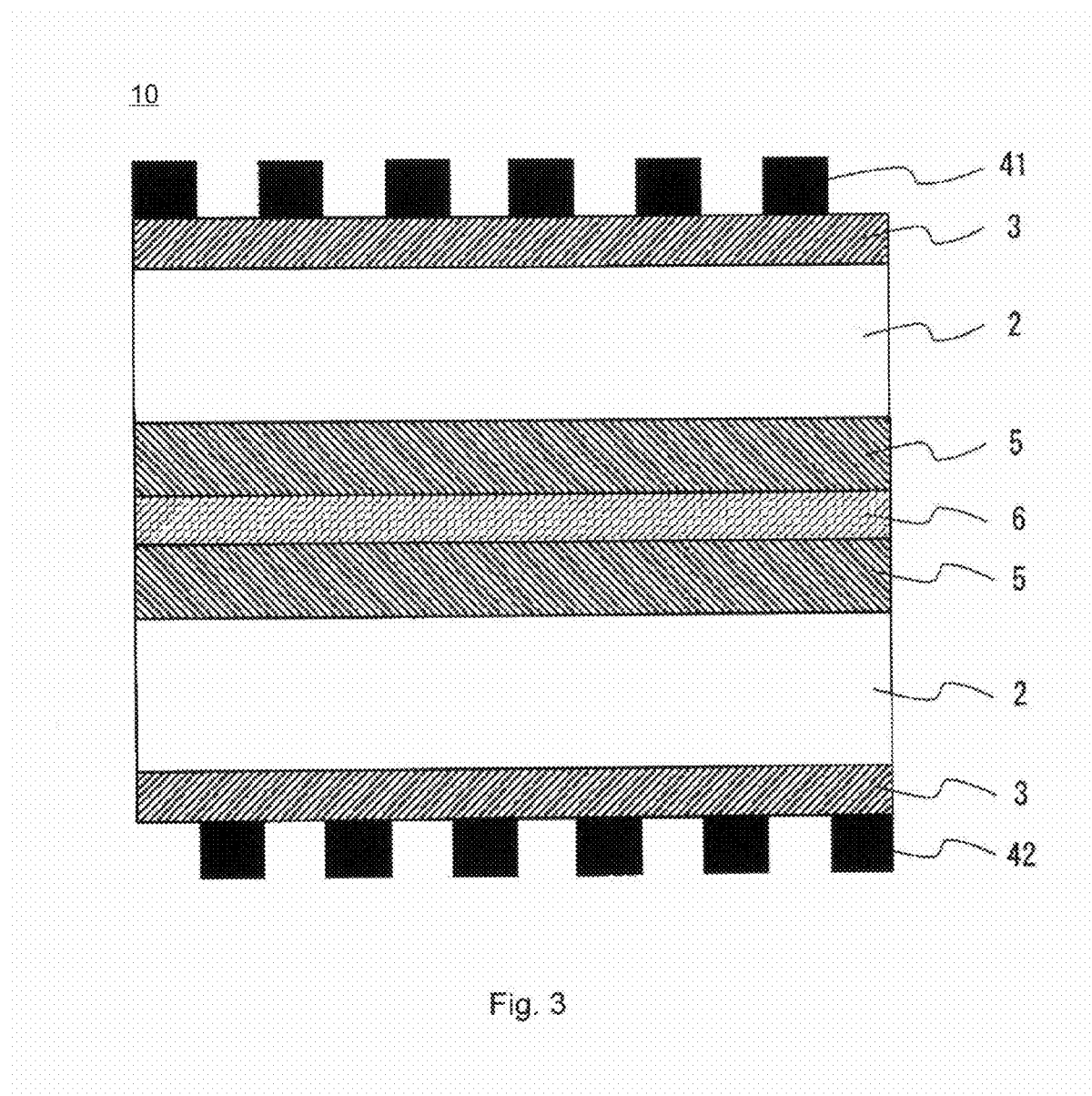
FIG. 3 shows one embodiment of the present invention and is a cross sectional view of a touch panel.
Figure 4:
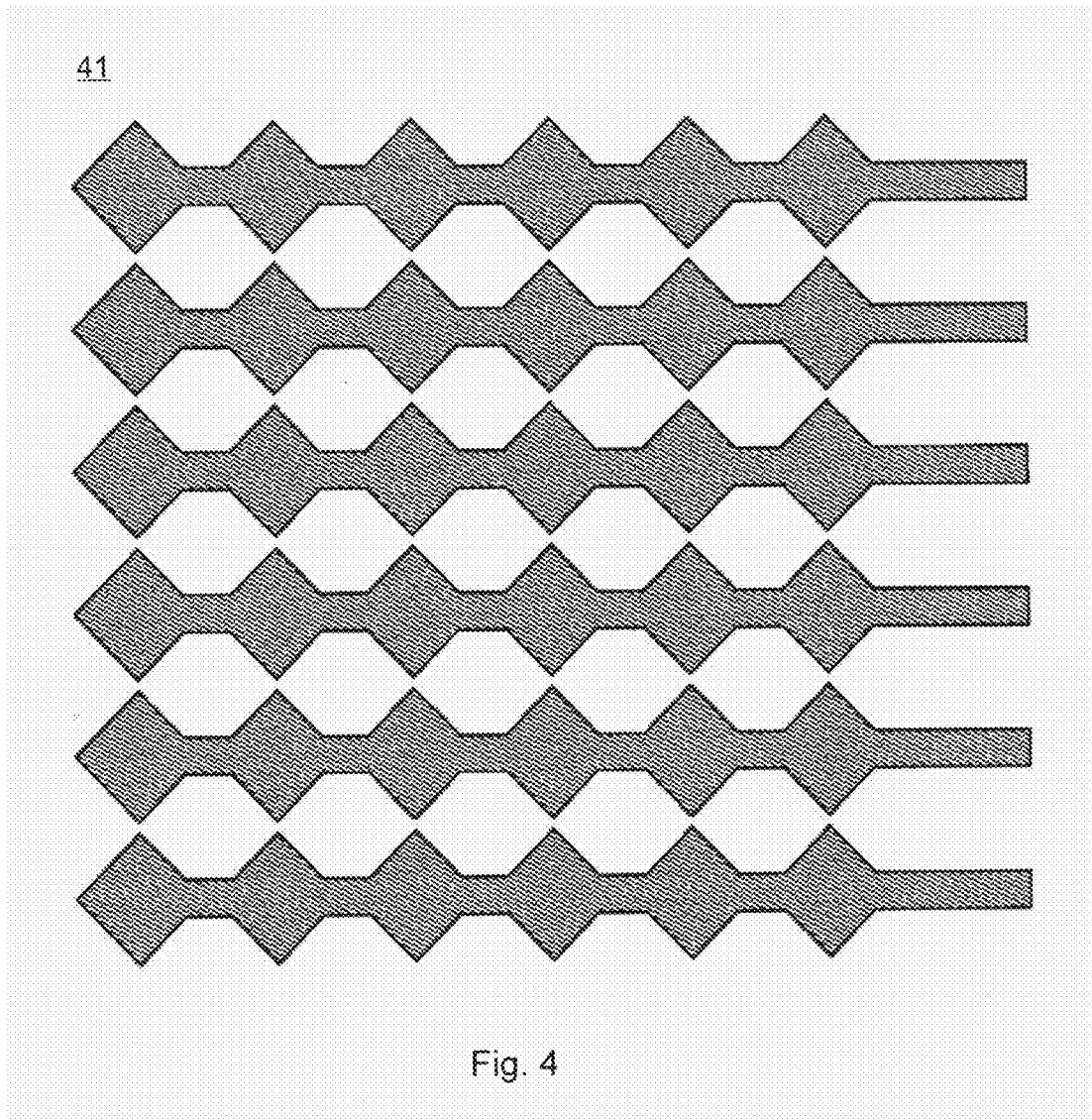
FIG. 4 shows one embodiment of the present invention and is a plan view of a transparent conductive layer which is patterned.
Figure 5:
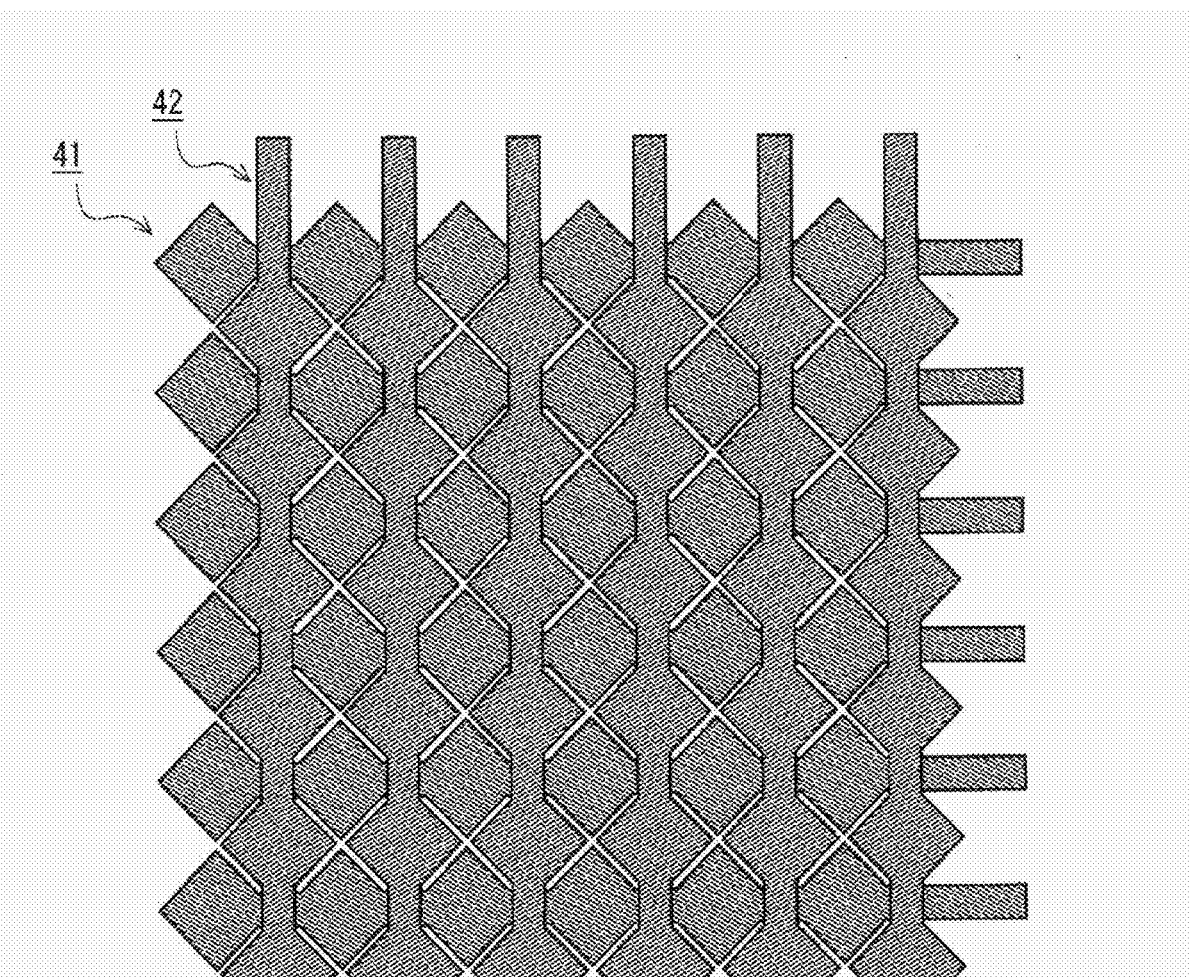
FIG. 5 shows one embodiment of the present invention and is a top plan view of two transparent conductive layers which are patterned.

FIG. 3 is a cross sectional view of the touch panel 10 in which patterning is performed on each of the transparent conductive layers 4 of two bonded transparent conductive films 1 so as to form transparent conductive layers 41 and 42. In the present invention, two transparent conductive films 1 are always bonded to each other with their surfaces opposite of the transparent conductive layer 4 being bonded to each other via an adhesion layer 6 since patterning is performed after they are bonded to each other. The patterning of the transparent conductive layer 4 forms a conductive pattern section and a non-conductive pattern section by processes of, for example, resist coating, exposure, etching and resist stripping. Patterning methods may include screen printing, photolithography, laser patterning and the like. Further, the resist may not be photosensitive and may be dry-curing. In that case, an exposure process is replaced with a drying process. As a patterning example of the transparent conductive layer 4, FIG. 4 shows the transparent conductive layer 41 which is patterned in a plurality of rhombus shapes as seen from above. In manufacturing of an electrostatic capacitance touch panel, the transparent conductive layers 41 and 42 need to be patterned so as not to be overlapped with each other when seen from above the touch panel 10. When a plurality of rhombus shapes shown in FIG. 4 are used, the transparent conductive layers 41 and 42 which are patterned so as not to be overlapped with each other are as shown in FIG. 5. With this configuration, one of the transparent conductive layers 41 and 42 can detect changes in electrostatic capacitance in the X direction and the other can detect changes in the Y direction.

As shown in FIG. 1, the touch panel 10 and the LCD display panel 30 are assembled via the shield layer 20. The shield layer 20 is a layer disposed for preventing electrical noise from the LCD display panel 30 from being transmitted to the touch panel 10, and needs to be transparent and electrically conductive.

Figure 6:
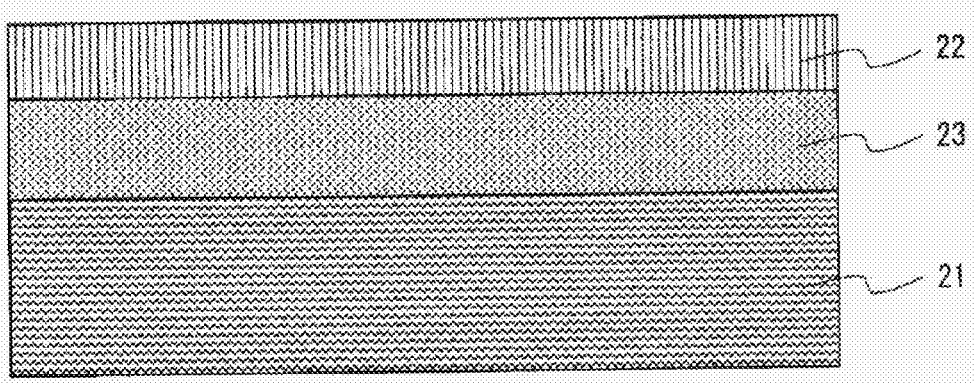
FIG. 6 shows one embodiment of the present invention and is a cross sectional view of a shield layer.

FIG. 6 shows a configuration of the shield layer 20 according to the present invention. A conductive film layer 22 is laminated on the substrate 21. An UV curable resin layer 23 which is a coating layer is disposed between the substrate 21 and the conductive film layer 22.

The substrate 21 may be formed of a transparent glass or a plastic film. The plastic film is not specifically limited as long as it has a low in-plane retardation and a low thickness direction retardation, sufficient strength during a film forming process and post treatment process, and surface smoothness, and may be formed of, for example, cycloolefin polymer, cycloolefin copolymer or the like. The substrate 21 may contain an additive such as antioxidant, antistatic agent, anti-UV agent, plasticizer, lubricant and easy adhesion agent. Further, in order to improve adhesiveness, a corona treatment, a low temperature plasma treatment may be performed.

The conductive film layer 22 is formed of a conductive material, which is a conductive polymer in the present invention. The conductive polymer may be a π-conjugated polymer, which includes, for example, polyacetylene, polydiacetylene, polyaniline, polyparaphenylene, polyparaphenylene vinylene, polythiophene, polyethylene dioxythiophene, polyfuran, polypyrrole, polyphenylene sulfide, poly pyridyl vinylene, and polyazine. They may be used alone or in combination of two or more thereof depending on the applications. Particularly, polyethylene dioxythiophene may be advantageously used for a shield layer since it has a surface resistance in the order of hundreds of Ω/□ (cm$^2$) and a relatively high transparency and is slightly blue in tone with its b* value negative, which means that it does not affect the entire tone of the display panel.

Methods for laminating the conductive film layer 22 on the substrate 21 may include a coating method such as a spin coating method, roller coating method, bar coating method, dip coating method, gravure coating method, curtain coating method, die coating method, spray coating method, doctor coating method and kneader coating method, and a print coating method such as a screen printing method, spray printing method, ink jet printing method, relief printing method, intaglio printing method and planographic printing method.

The conductive polymer used for the conductive film layer 22 is preferably in the form of a liquid, taking into consideration the above coating method. In order to use the conductive polymer in the form of a liquid, the conductive polymer is preferably dissolved or dispersed in water or organic solvent such as alcohol, ether, ketone, ester, hydrocarbon, halogenated hydrocarbon and amide. Particularly, a solvent such as water, methanol, ethanol and isopropyl alcohol can be easily used for cost reasons. Further, an additive such as a dispersant and surfactant may be added to improve dispersibility of the polymer, an additive may be added to improve film strength of the conductive film layer 22, or a hardener may be added to promote film curing.

A method for film curing of the conductive film layer 22 may be heat curing or UV curing depending on the types of the π-conjugated polymers used or the types of the added hardeners.

In some cases, the π-conjugated polymers alone may not show any electrically conductive property and may have an electrically conductive property when positive or negative charges are added to the π-conjugated polymers by addition of a dopant. Therefore, a dopant is preferably added. For example, in the case of polydioxythiophene, polystyrene sulfonic acid is typically added as a dopant.

The transmission color of the conductive film layer 22 is more bluish and less yellowish in tone when the transmission b* value becomes larger in the negative direction. The b* value can be controlled by varying the film thickness of the conductive polymer film, and the conductive polymer film having the optimum film thickness can be applied according to the degree of yellow tone of the transmission color of the touch panel 10.

The coating layer 23 is provided to prevent oligomer from being precipitated from the underlying substrate 21. A shield layer 20 capable of preventing precipitation of oligomer and having high transmittance can be formed by selecting a suitable material, film thickness and curing method for the conductive film layer 22 which constitutes the shield layer 20. This can be achieved, for example, by forming a 3 μm layer made of acrylic UV curable resin when the above described polyethylene dioxythiophene is used for the conductive film layer 22.

Methods for forming the coating layer 23 may include, similarly to the method for forming the conductive polymer layer, a coating method such as a spin coating method, roller coating method, bar coating method, dip coating method, gravure coating method, curtain coating method, die coating method, spray coating method, doctor coating method and kneader coating method, and a print coating method such as a screen printing method, spray printing method, ink jet printing method, relief printing method, intaglio printing method and planographic printing method.

The LCD display panel 30 has a configuration similar to a common LCD display panel, in which a substrate (array substrate) having switching elements that drive a liquid crystal and an electrode layer disposed thereon and a color filter substrate having an opposing electrode layer formed thereon are disposed on opposite sides of the liquid crystal layer, and polarizers are each mounted on the array substrate and the color filter substrate. Driving methods of the LCD display panel 30 include, but are not specifically limited to, IPS (registered trade mark) method, TN method, VA method and the like.

A plastic film is used for the transparent substrate 2 of the present embodiment. The plastic film is not specifically limited as long as it has a refractive index in the range of 1.45 to 1.75, a sufficient strength during the film forming process and post-process, and a high surface smoothness, and may be, for example, polyethylene terephthalate, polybutylene terephthalate, polyethylene naphthalate, polycarbonate, polyethersulfone, polysulfone, polyarylate, cyclic polyolefin, polyimide, triacetylcellulose. The thickness of the plastic film is preferably of the order of 10 μm or more and 200 μm or less, considering the reduced thickness of the transparent conductive film 1 and the flexibility of the transparent substrate 2. In particular, when the touch panel is required to be optically isotropic, a film having low retardation such as cycloolefin polymer, cycloolefin copolymer, polycarbonate and triacetylcellulose can be selected. The transparent conductive film 1 preferably has an in-plane retardation Re of 30 nm or less and a thickness direction retardation Rth of 100 nm or less.

As shown in FIG. 2, in the transparent conductive film 1 used for the touch panel 10 of the present embodiment, the undercoat layer 3 and the transparent conductive layer 4 are disposed in sequence on one surface of the transparent substrate 2.

The undercoat layer 3 has a function of adjusting the transmittance and hue of the transparent conductive film 1 for providing invisibility for the wiring pattern. These optical properties can be controlled by appropriately adjusting the refractive index and the film thickness of the undercoat layer 3 relative to the refractive index and the film thickness of the transparent substrate 2 and the transparent conductive layer 4.

Since the undercoat layer 3 is required to have high adhesiveness to the transparent substrate 2 and the transparent conductive layer 4 in addition to the above optical properties, it is desirable that the undercoat layer 3 has organic characteristics on a side close to the transparent substrate 2 which is a plastic film and inorganic characteristics on a side close to the transparent conductive layer 4 which is a metal oxide.

An organic hard coating agent containing silicon is used for the undercoat layer 3. Further, a highly refractive material which is an inorganic compound for adjusting a refractive index is added to the hard coating agent. The hard coating agent is preferably a photo-curable type in which carbon atoms in a surface layer (a surface which is not in contact with the transparent substrate 2) decrease during curing. However, the hard coating agent is not limited thereto, and may be any type as long as it can be controlled to have a higher carbon content ratio on the side close to the transparent substrate 2 in the thickness direction and a higher silicon content ratio on the side close to the transparent conductive layer 4. Specifically, control methods may include adjusting a light amount during photo-curing, adjusting a drying condition during drying after coating of the hard coating agent, in addition to selecting the type of hard coating agent.

The undercoat layer 3 is formed to have a higher carbon content ratio on the side close to the transparent substrate 2 which is a plastic film to enhance its organic characteristics, and a higher silicon content ratio on the side close to the transparent conductive layer 4 which is a metal oxide to enhance its inorganic characteristics. Accordingly, both interfaces of the undercoat layer 3 have improved adhesiveness. Specifically, a relation of carbon atom content ratio X (C30) (%) and silicon atom content ratio X (Si30) (%) in the undercoat layer 3 in a portion of 30 nm or less in thickness from the transparent conductive layer 4 is expressed by the following equation (1), while a relation of carbon atom content ratio X (C40) (%) and silicon atom content ratio X (Si40) (%) in the undercoat layer 3 in a portion of 40 nm or more in thickness from the transparent conductive layer 4 is expressed by the following equation (2):

$$X(\text{Si}30)/X(\text{C}30) \geq 0.28 \quad (1)$$

$$X(\text{Si}40)/X(\text{C}40) \leq 0.23 \quad (2)$$

Measurement of the carbon atom content ratios X (C30) (%) and X (C40) (%) and the silicon atom content ratios X (Si30) (%) and X (Si40) (%) is performed by using X-ray photoelectron spectroscopy (ESCA, also referred to as electron spectroscopy for chemical analysis). The X-ray photoelectron spectroscopy can determine the quantity of elements in the thickness direction from the outermost surface of the undercoat layer 3 on the basis of the spectrum.

The undercoat layer 3 may contain an additive such as a photopolymerization initiator.

When a photopolymerization initiator is added, the radical generating photopolymerization initiator may be benzoins and alkyl ethers thereof such as benzoin, benzoin methyl ether, benzoin ethyl ether, benzoin isopropyl ether, benzyl methyl ketal, acetophenones such as acetophenone, 2,2-dimethoxy-2-phenyl acetophenone, 1-hydroxycyclohexyl phenyl ketone, anthraquinones such as methyl anthraquinone, 2-ethyl anthraquinone, 2-amylanthraquinone, thioxanthones such as thioxanthone, 2,4-diethylthioxanthone, 2,4-diisopropylthioxanthone, ketals such as acetophenone dimethyl ketal, benzyl dimethyl ketal, benzophenones such as benzophenone, 4,4-bismethyl aminobenzophenone and azo compounds. They can be used alone or as a mixture of two or more thereof, or even in combination with a photoinitiation auxiliary such as tertiary amines such as triethanolamine, methyldiethanol amine, benzoic acid derivatives such as 2-dimethylaminoethyl benzoate, 4-dimethylamino benzoic acid ethyl ester or the like.

The addition amount of the above photopolymerization initiator is in the range of 0.1% by weight or more and 5% by weight or less, and more preferably, 0.5% by weight or more and 3% by weight or less of the main component resin. If the amount is less than the lower limit, a hard coating layer is not sufficiently cured, which is not desirable. Further, if the amount is over the upper limit, the hard coating layer has a yellow discoloration or decrease in light resistance, which is not desirable. Light used for curing a photo-curable resin is ultraviolet rays, electron beams, gamma rays or the like. In a case of electron beams or gamma rays, a photopolymerization initiator or a photoinitiation auxiliary may not necessarily be added. The radiation source may be a high pressure mercury lamp, xenon lamp, metal halide lamp, accelerated electron generator or the like.

The highly refractive material may include, for example, inorganic compound such as titanium oxide (2.4), zirconium oxide (2.4), zinc sulfide (2.3), tantalum oxide (2.1), zinc oxide (2.1), indium oxide (2.0), niobium oxide (2.3) and tantalum oxide (2.2), where the numbers in parentheses represent a refractive index.

The highly refractive material preferably has a particle diameter of 1-30 nm, and is preferably in the form of powder or solvent dispersion sol. The above described highly refractive material is added to the hard coating agent. A dispersion medium may include, for example, alcohols such as methanol, ethanol, isopropanol, sec-butanol, n-butanol, t-butanol, octanol; ketones such as acetone, methyl ethyl ketone, methyl isobutyl ketone, cyclohexanone, methyl amyl ketone; esters such as ethyl acetate, butyl acetate, ethyl lactate, γ-butyrolactone, propyleneglycol monomethylether acetate; ethers such as ethylene glycol monomethylether, diethylene glycol monobutylether, propyleneglycol monomethylether; aromatic hydrocarbons such as benzene, toluene, xylene; amides such as dimethylformamide, dimethylacetamide, N-methylpyrrolidone. In particular, methanol, isopropanol, methyl ethyl ketone, methyl isobutyl ketone, ethyl acetate, butyl acetate, toluene, xylene, propyleneglycol monomethylether are preferable.

A commercially available product of titanium oxide particles may be, for example, a solvent dispersion such as TS-103, 884T, TS-069 manufactured by Tayca Corporation, a toluene dispersion of zirconia such as HXU-110JC manufactured by Sumitomo Osaka Cement Co., Ltd., and zirconia particles such as UEP-100 manufactured by Daiichi Kigenso Kagaku Kogyo Co., Ltd., PCS, JS-01, JS-03, JS-04 manufactured by Nihon Denko Co., Ltd.

The refractive index of the undercoat layer 3 may be adjusted to a desired value by varying the content of highly refractive material. The refractive index of the undercoat layer 3 is preferably adjusted to be in the range of 1.5 to 2.0, and higher than the refractive index of the transparent substrate 2 and lower than the refractive index of the transparent conductive layer 4. However, the addition amount should be such that the content accounts for 40% by weight or less of the total amount of compositions of the undercoat layer 3 excluding the solvent which is 100% by weight. If the addition amount exceeds 40% by weight, the entire undercoat layer 3 is mineralized, thereby reducing adhesiveness to the transparent substrate 2 which is a polymer film.

Further, although the thickness of the undercoat layer 3 is adjusted depending on the refractive index, it should be 60 nm or more when a photo-curable type hard coating agent is used. If the thickness is smaller than 60 nm, photo-curing causes decrease of carbon atoms on a side close to the transparent substrate 2, thereby reducing adhesiveness of the interface to the transparent substrate 2. Further, the oxygen atom content ratio in the undercoat layer 3 in a portion of 30 nm or less in thickness from the transparent conductive layer 4 is preferably 45% or more, and the content ratio in the undercoat layer 3 in a portion of 40 nm or more in thickness from the transparent conductive layer 4 is preferably 30% or less. The oxygen atom content ratio can be measured by the above X-ray photoelectron spectroscopy.

Methods of forming the undercoat layer 3 include dissolving a main component resin or the like into a solvent, and applying it by a known coating method such as a die coater, curtain flow coater, roll coater, reverse roll coater, gravure coater, knife coater, bar coater, spin coater and micro gravure coater.

The solvent is not specifically limited as long as it dissolves the above main component resin or the like. Specifically, the solvent may be ethanol, isopropyl alcohol, isobutyl alcohol, benzene, toluene, xylene, acetone, methyl ethyl ketone, methyl isobutyl ketone, ethyl acetate, n-butyl acetate, isoamyl acetate, ethyl lactate, methyl cellosolve, ethyl cellosolve, butyl cellosolve, methyl cellosolve acetate and propylene glycol monomethyl ether acetate. Those solvent may be used alone or in combination of two or more thereof.

The transparent conductive film 1 used for the touch panel 10 of the present embodiment includes the transparent conductive layer 4 made of metal oxide which is disposed on the undercoat layer 3 as shown in FIG. 2.

The transparent conductive layer 4 is made of metal oxide, and the metal oxide may be any of indium oxide, zinc oxide and tin oxide, or a mixture of two or three of these oxides, or a mixture with any other additive. The material is not specifically limited, and a variety of materials may be used depending on the purpose, use application. The material which is currently most reliable and commonly used is indium tin oxide (ITO).

When indium tin oxide (ITO) is used as a material of the transparent conductive layer 4, the content ratio of tin oxide doped to indium oxide may be appropriately selected depending on the specification required for a device. In the transparent substrate 2, the material used to crystallize a thin film for improving mechanical strength preferably has the tin oxide content ratio of less than 10% by weight, while the material used to amorphize a thin film for providing flexibility preferably has the tin oxide content ratio of 10% by weight or more. Further, when a low resistance is required for a thin film, the tin oxide content ratio is preferably in the range of 2 to 20% by weight.

The transparent conductive layer 4 may be formed by any manufacturing method as long as a film thickness can be controlled, and a dry coating method for thin film is advantageously used. This includes a vacuum deposition method, a physical vapor phase deposition method such as sputtering and a chemical vapor phase deposition method such as CVD method. Particularly, a sputtering method is preferable to form a thin film of a uniform quality across a large area, since it has a stable process and forms a highly precise thin film.

Although the thickness of the transparent conductive layer 4 is not specifically limited and may be appropriately adjusted depending on the application purpose, it is preferably in the range of, for example, 10 nm or more and 50 nm or less.

In the transparent conductive film 1 used for the touch panel 10 of the present embodiment, as shown in FIG. 2, the transparent thin film layer 5 is preferably formed to impart mechanical strength on a side of the transparent substrate 2 on which the transparent conductive layer 4 is not formed. In this example, the transparent thin film layer 5 is made of an organic compound.

The resin used for the transparent thin film layer 5 is not specifically limited, but is preferably a resin having transparency and appropriate hardness and mechanical strength, specifically, a photo-curable resin such as a monomer or cross-linking oligomer having a main component of tri- or polyfunctional acrylate which is expected to be cross-linked in three dimensional arrays.

The tri- or polyfunctional acrylate monomer is preferably a trimethylolpropane triacrylate, EO-modified isocyanurate triacrylate, pentaerythritol triacrylate, dipentaerythritol triacrylate, dipentaerythritol tetraacrylate, dipentaerythritol pentaacrylate, dipentaerythritol hexaacrylate, ditrimethylolpropane tetraacrylate, pentaerythritol tetraacrylate, and polyester acrylate. Particularly, EO-modified isocyanurate triacrylate and polyester acrylate are preferable. They may be used alone or in combination of two or more thereof. Further, so-called acryl-based resin such as epoxyacrylate, urethaneacrylate and polyolacrylate may also be used in addition to tri- or polyfunctional acrylate.

The cross-linking oligomer is preferably an acryl oligomer such as polyester (meta)acrylate, polyether (meta)acrylate, polyurethane (meta)acrylate, and epoxy (meta)acrylate and silicone (meta)acrylate. Specifically, polyethylene glycol di(meta)acrylate, polypropyleneglycol di(meta)acrylate, bisphenol A epoxy acrylate, diacrylate of polyurethane, and cresol novolac epoxy (meta)acrylate may be used.

In addition to that, additives such as particles, photopolymerization initiator may be added to the transparent thin film layer 5.

The added particles may be organic or inorganic particles. However, considering transparency, organic particles are preferable. The organic particles may be particles formed of acryl resin, polystyrene resin, polyester resin, polyolefin resin, polyamide resin, polycarbonate resin, polyurethane resin, silicone resin and fluorocarbon resin.

Although the average particle diameter varies depending on the thickness of the transparent thin film layer 5, it is preferable by reason of outer appearance such as haze to use particles having a lower limit of 2 μm or more, more preferably 5 μm or more, and an upper limit of 30 μm or less, more preferably 15 μm or less. Further, for the same reason, the content of particles is preferably 0.5% by weight or more and 5% by weight or less of the resin.

When a photopolymerization initiator is added, a radical generating photopolymerization initiator may be benzoins and alkyl ethers thereof such as benzoin, benzoin methyl ether, benzoin ethyl ether, benzoin isopropyl ether, benzyl methyl ketal, acetophenones such as acetophenone, 2,2-dimethoxy-2-phenyl acetophenone, 1-hydroxycyclohexyl phenyl ketone, anthraquinones such as methyl anthraquinone, 2-ethyl anthraquinone, 2-amylanthraquinone, thioxanthones such as thioxanthone, 2,4-diethylthioxanthone, 2,4-diisopropyl thioxanthone, ketals such as acetophenone dimethylketal, benzyl dimethyl ketal, benzophenones such as benzophenone, 4,4-bismethyl aminobenzophenone and azo compounds. They can be used alone or as a mixture of two or more thereof, or even in combination with a photoinitiation auxiliary such as tertiary amines such as triethanolamine, methyldiethanol amine, benzoic acid derivatives such as 2-dimethylaminoethyl benzoate, 4-dimethylamino benzoic acid ethyl ester.

The addition amount of the above photopolymerization initiator is in the range of 0.1% by weight or more and 5% by weight or less and more preferably, 0.5% by weight or more and 3% by weight or less of the main component resin. If the amount is less than the lower limit, a hard coating layer is not sufficiently cured, which is not desirable. Further, if the amount is over the upper limit, the hard coating layer has yellow discoloration or decrease in light resistance, which is not desirable. Light used for curing a photo-curable resin is ultraviolet rays, electron beams, gamma rays or the like. In a case of electron beams or gamma rays, a photopolymerization initiator or a photoinitiation auxiliary may not be necessarily added. The radiation source may be a high pressure mercury lamp, xenon lamp, metal halide lamp, accelerated electron generator or the like.

Further, although the thickness of the transparent thin film layer 5 is not specifically limited, it is preferably in the range of 0.5 μm or more and 15 μm or less. More preferably, the transparent thin film layer 5 has the same or approximately same refractive index as that of the transparent substrate 2, which is preferably in the order of 1.45 or more and 1.75 or less.

Method of forming the transparent thin film layer 5 include dissolving a main component resin or the like into a solvent and applying it by a known coating method such as a die coater, curtain flow coater, roll coater, reverse roll coater, gravure coater, knife coater, bar coater, spin coater and micro gravure coater.

The solvent is not specifically limited as long as it dissolves the above main component resin or the like. Specifically, the solvent may be ethanol, isopropyl alcohol, isobutyl alcohol, benzene, toluene, xylene, acetone, methyl ethyl ketone, methyl isobutyl ketone, ethyl acetate, n-butyl acetate, isoamyl acetate, ethyl lactate, methyl cellosolve, ethyl cellosolve, butyl cellosolve, methyl cellosolve acetate and propylene glycol monomethyl ether acetate. Those solvent may be used alone or in combination of two or more thereof.

In the embodiment of FIG. 3, the transparent conductive layers 41 and 42 are formed by performing patterning on each side of the touch panel 10 after the transparent thin film layers 5 of two transparent conductive films 1 are bonded to each other via the adhesion layer 6 as described above. The patterning process may use screen printing, photolithography, laser patterning and the like. The formed pattern is not easily seen by visual observation due to the effect of the undercoat layer 3 which is provided as an optical adjustment layer. Accordingly, the display device 60 having the touch panel which has high pattern invisibility can be provided through the subsequent processes.

An example of the present invention will be specifically described. The manufacturing process of the transparent conductive film is a roll to roll method.

<Example>

In the configuration of FIG. 2, PET having a film thickness of 125 μm (U483-125, manufactured by Toray Industries, Inc.) was used as the transparent substrate.

A hard coating liquid (composition: 100 parts by weight of urethane acrylate (UA-510H, manufactured by Kyoeisha Chemical Co., Ltd), 4 parts by weight alkylphenone-based photopolymerization initiator (IRGACURE (registered trademark) 907, manufactured by BASF Japan, Ltd.), and 100 parts by weight of ethyl acetate) was applied on one surface of the transparent substrate by a gravure coating method in a cured film thickness of 4 μm, dried, and radiated with ultraviolet light at 400 mJ/cm$^2$ from a metal halide lamp to form a transparent thin film layer.

Then, a hard coating liquid (manufactured by Nippon Soda Co., Ltd., zirconium oxide is added to a surface mineralization hard coat as a highly refractive material for adjustment of refractive index) was applied on a surface of the transparent substrate which does not have the transparent thin film layer by a gravure coating method, dried, and radiated with ultraviolet ray from a metal halide lamp to form a undercoat layer. Here, samples were prepared as shown in Nos. 1 to 16 in Table 1 by varying conditions of a cured film thickness, X (Si30)/X (C30), X (Si40)/X (C40), and zirconium oxide content to the total amount of compositions of the undercoat layer which is 100% by weight. The X (S130), X (C30) represent the content ratios (%) of silicon atoms, carbon atoms, respectively, in the undercoat layer in a portion of 30 nm or less in thickness from the transparent conductive layer, while the X (Si40), X (C40) represent the content ratios (%) of silicon atoms, carbon atoms, respectively, in the undercoat layer in a portion of 40 nm or more in thickness from the transparent conductive layer.

Then, a transparent conductive film was manufactured by forming a transparent conductive layer on the undercoat layer of the transparent substrate by DC magnetron sputtering method for each sample. Here, an ITO which contains 10% by weight of tin oxide was used as a material of the transparent conductive layer. The thickness of the transparent conductive layer was 20 nm.

From simulation of optical properties of the respective layers, it is known that the film thickness of the undercoat layer for an optimum pattern invisibility of the transparent conductive film is 100 nm when the undercoat layer and the transparent conductive layer are formed on the transparent substrate of this example under the above conditions. In this case, the zirconium oxide content ratio in the undercoat layer is 30% by weight.

The transparent conductive film was evaluated on the following items.

<Evaluation Items>

1. Pattern Invisibility

A wire pattern was formed by etching the transparent conductive layer, and invisibility of the pattern when seen from the transparent conductive layer side was evaluated.

2. Adhesiveness

In compliance with JIS K5600, 11 cutouts were made vertically and horizontally with 1 mm intervals on the coating of the transparent conductive layer to make 100 pieces of squares of grid. A cellophane tape (Sellotape (registered trademark)) was attached to each sample and rubbed thereto for a plurality of times by using a rubber eraser so that the tape was closely adhered. Then, the tape was pulled off and the number of squares of grid whose coating remained without being peeled off was checked. When the coating was peeled off, whether the peeling occurred on the interface between the undercoat layer and the transparent conductive layer or the interface between the undercoat layer and the transparent substrate was checked.

Table 1 shows the results of evaluation on the pattern invisibility and the adhesiveness. For the invisibility, "+" represents that the pattern was invisible, while "−" represents that the pattern was visible. For the adhesiveness, "+" represents that no square of grid was peeled off, while "−" represents that one or more squares of grid were peeled off and the interface on which the peeling occurred was specified.

<Evaluation Results> side close to the transparent substrate caused high organic component on the interface, thereby improving adhesiveness to the transparent substrate. Under the conditions of X (Si30)/X (C30)=0.40, X (Si40)/X (C40)=0.02 in which good adhesion was observed between the undercoat layer and the transparent conductive layer, the undercoat layer and the transparent substrate, the pattern invisibility decreased if the cured film thickness or the zirconium oxide content was varied as shown in Nos. 13 to 16. This was because the refractive index and the film thickness were deviated from the optimum condition of the undercoat layer which was the optical adjustment layer to the refractive index and the film thickness of the transparent substrate and the transparent conductive layer. Furthermore, when the addition amount of zirconium oxide content exceeded 40% by weight, peeling occurred on the interface between the undercoat layer and the substrate. This was because the content ratio of zirconium oxide which was the inorganic compound increased, which caused the interface to the transparent substrate to be mineralized, thereby reducing adhesiveness. Accordingly, it was revealed that the content of highly refractive material should be 40% by weight or less.

TABLE 1

| Sample No. | Cured film thickness [nm] | X (Si30)/ X (C30) | X (Si40)/ X (C40) | Zirconium oxide content [% by weight] | Pattern invisibility | Adhesiveness Result | Peeled interface |
|---|---|---|---|---|---|---|---|
| 1 | 100 | 0.23 | 0.02 | 30 | + | − | Transparent conductive layer |
| 2 | 100 | 0.23 | 0.23 | 30 | + | − | Transparent conductive layer |
| 3 | 100 | 0.23 | 0.28 | 30 | + | − | Transparent conductive layer |
| 4 | 100 | 0.28 | 0.02 | 30 | + | + | N/A |
| 5 | 100 | 0.28 | 0.23 | 30 | + | + | N/A |
| 6 | 100 | 0.28 | 0.28 | 30 | + | − | Transparent substrate |
| 7 | 100 | 0.40 | 0.02 | 30 | + | + | N/A |
| 8 | 100 | 0.40 | 0.23 | 30 | + | + | N/A |
| 9 | 100 | 0.40 | 0.28 | 30 | + | − | Transparent substrate |
| 10 | 100 | 0.60 | 0.02 | 30 | + | + | N/A |
| 11 | 100 | 0.60 | 0.23 | 30 | + | + | N/A |
| 12 | 100 | 0.60 | 0.28 | 30 | + | − | Transparent substrate |
| 13 | 50 | 0.40 | 0.02 | 30 | − | − | Transparent substrate |
| 14 | 60 | 0.40 | 0.02 | 30 | − | + | N/A |
| 15 | 100 | 0.40 | 0.02 | 40 | − | + | N/A |
| 16 | 100 | 0.40 | 0.02 | 45 | − | − | Transparent substrate |

As seen from Table 1, when the zirconium oxide content in the undercoat layer was 30% by weight and the cured film thickness was 100 nm, success of adhesion between the undercoat layer and the transparent conductive layer was observed (no peeled squares of grid were found) if X (Si30)/X (C30) was 0.28 or more. This was because increase of the silicon content ratio in the undercoat layer on a side close to the transparent conductive layer caused mineralization of the interface, thereby improving adhesiveness to the transparent conductive layer. Likewise, when the zirconium oxide content in the undercoat layer was 30% and the cured film thickness was 100 nm, success of adhesion between the undercoat layer and the transparent substrate was observed (no peeled square of grid was found) if X (Si40)/X (C40) was 0.23 or less. This was because a predetermined level or more of the carbon content ratio in the undercoat layer on a In light of the above results, the transparent conductive film was manufactured to have the undercoat layer having the optimum film thickness of 60 nm or more, the content of highly refractive material of 40% by weight or less, X (Si30)/X (C30) of 0.28 or more, and X (Si40)/X (C40) of 0.25 or less. Then, a touch panel was manufactured by using this transparent conductive film, and a display device having the touch panel as a component was manufactured.

Accordingly, the display device having the touch panel as a component and the touch panel having the transparent conductive film as a component was provided having sufficient pattern invisibility, in which the transparent conductive film has high adhesiveness between the substrate which is a polymer film and the optical adjustment layer and between the optical adjustment layer and the transparent conductive layer which is a metal oxide in spite of the optical adjustment layer being formed in the transparent conductive film by wet coating.

A film forming process of the optical adjustment layer includes dry coating and wet coating. The latter includes a method of coating an organic resin with an additive of high refractive index added. In the above configuration, the optical adjustment layer has high adhesiveness to the substrate which is a polymer film since they are both organic substances. However, it does not have sufficient adhesiveness to the transparent conductive layer which is a metal oxide.

PTL 1 (JP-A-2008-007610) proposes a coating agent which has an organic layer and an inorganic layer in order to improve adhesiveness to the substrate and increase surface hardness. The coating agent is disposed between the substrate and the transparent conductive layer so that the organic layer is located on a side close to the substrate and the inorganic layer is located on a side close to the transparent conductive layer. Although it seems that high adhesiveness is achieved between the substrate and the coating agent and between the coating agent and the transparent conductive layer, this is not enough for it to function as the optical adjustment layer of the transparent conductive film.

The present invention has been made to overcome the above problem of the conventional technique, and an object of the invention is to provide a transparent conductive film which has high adhesiveness between the substrate which is a polymer film and the optical adjustment layer and between the optical adjustment layer and the transparent conductive layer which is a metal oxide, in spite of the optical adjustment layer being formed in the transparent conductive film by wet coating, and has high pattern invisibility, and also to provide a touch panel having the transparent conductive film, and a display device which includes the touch panel as a component.

In order to solve the above problem, one aspect of the present invention is a transparent conductive film which has an undercoat layer and a transparent conductive layer laminated in sequence on one surface of a transparent substrate, wherein the undercoat layer has a refractive index in a range of 1.5 to 2.0, the undercoat layer has a refractive index higher than a refractive index of the transparent substrate and lower than a refractive index of the transparent conductive layer, a highly refractive material content is 40% by weight or less of a total amount of compositions of the undercoat layer which is 100% by weight, a relation of carbon atom content ratio X (C30) (%) and silicon atom content ratio X (Si30) (%) in the undercoat layer in a portion of 30 nm or less in thickness from the transparent conductive layer is expressed by an equation (1), and a relation of carbon atom content ratio X (C40) (%) and silicon atom content ratio X (Si40) (%) in the undercoat layer in a portion of 40 nm or more in thickness from the transparent conductive layer is expressed by an equation (2):

$$X(Si30)/X(C30) \geq 0.28 \quad (1)$$

$$X(Si40)/X(C40) \leq 0.23 \quad (2)$$

Further, the undercoat layer may have a film thickness of 60 nm or more.

Further, an oxygen atom content ratio in the undercoat layer in a portion of 30 nm or less in thickness from the transparent conductive layer may be 45% or more, and an oxygen atom content ratio in the undercoat layer in a portion of 40 nm or more in thickness from the transparent conductive layer may be 30% or less.

Further, the transparent conductive film may be metal oxide.

Further, the transparent substrate may be a plastic film having a refractive index in a range of 1.45 to 1.75.

Further, the transparent conductive film may have an in-plane retardation Re of 30 nm or less and a thickness direction retardation Rth of 100 nm or less.

Further, an organic compound layer may be provided on a surface of the transparent conductive film opposite to the transparent conductive layer.

Another aspect of the present invention is a touch panel which includes the above transparent conductive film as a component.

Another aspect of the present invention is a display device which includes the above touch panel as a component.

Accordingly the present invention can provide a transparent conductive film which has high adhesiveness between the substrate which is a polymer film and the optical adjustment layer and between the optical adjustment layer and the transparent conductive layer which is a metal oxide in spite of the optical adjustment layer being formed in the transparent conductive film by wet coating, and has high pattern invisibility, and provide a touch panel having the transparent conductive film, and a display device which includes the touch panel as a component.

The present invention can be applied to displays of e-book readers, tablet terminals, smartphones, cell phones, electric paper, computers and the like.

DESCRIPTION OF REFERENCE NUMERALS 1 transparent conductive film
2 transparent substrate
3 undercoat layer
4, 41, 42 transparent conductive layer
5 transparent thin film layer
6 adhesion layer
10 touch panel
20 shield layer
21 substrate
22 conductive film layer
23 coating layer
30 LCD display panel
40 front panel layer
50 adhesive layer
60 display device having touch panel Obviously, numerous modifications and variations of the present invention are possible in light of the above teachings. It is therefore to be understood that within the scope of the appended claims, the invention may be practiced otherwise than as specifically described herein.

What is claimed is:

1. A transparent conductive film, comprising:
a transparent substrate;
an undercoat layer formed on the transparent substrate; and
a transparent conductive layer formed on the undercoat layer,
wherein the undercoat layer has a refractive index in a range of from 1.5 to 2.0, which is higher than a refractive index of the transparent substrate and lower than a refractive index of the transparent conductive layer,
the undercoat layer is made of a composition including a refractive material having a refractive index of 2.0 or greater in an amount of 40 wt. % or less with respect to a total amount of the composition of the undercoat layer, the undercoat layer includes a silicon atom and a carbon atom and satisfies formulas (1) and (2):

$$X(Si30)/X(C30) \geq 0.28 \quad (1)$$

$$X(Si40)/X(C40) \leq 0.23 \quad (2)$$

where $X(Si30)$ and $X(C30)$ are a silicon atom content and a carbon atom content in % in the undercoat layer in a portion of 30 nm or less in thickness from the transparent conductive layer, and $X(Si40)$ and $X(C40)$ are a silicon atom content and a carbon atom content in % the undercoat layer in a portion of 40 nm or more in thickness from the transparent conductive layer.

2. The transparent conductive film according to claim 1, wherein the transparent conductive film has an in-plane retardation Re of 30 nm or less and a thickness direction retardation Rth of 100 nm or less.

3. The transparent conductive film according to claim 1, further comprising:

an organic compound layer formed on the transparent substrate opposite of the undercoat layer.

4. The transparent conductive film according to claim 1, wherein the undercoat layer has a thickness of 60 nm or more.

5. The transparent conductive film according to claim 4, wherein the undercoat layer has an oxygen atom content of 45% or more in the portion of 30 nm or less in thickness from the transparent conductive layer, and has an oxygen atom content of 30% or less in the portion of 40 nm or more in thickness from the transparent conductive layer.

6. The transparent conductive film according to claim 4, wherein the transparent conductive layer comprises a metal oxide.

7. The transparent conductive film according to claim 4, wherein the transparent substrate is a plastic film having a refractive index in a range of from 1.45 to 1.75.

8. The transparent conductive film according to claim 4, wherein the transparent conductive film has an in-plane retardation Re of 30 nm or less and a thickness direction retardation Rth of 100 nm or less.

9. The transparent conductive film according to claim 1, wherein the undercoat layer has an oxygen atom content of 45% or more in the portion of 30 nm or less in thickness from the transparent conductive layer, and has an oxygen atom content of 30% or less in the portion of 40 nm or more in thickness from the transparent conductive layer.

10. The transparent conductive film according to claim 9, wherein the transparent conductive layer comprises a metal oxide.

11. The transparent conductive film according to claim 9, wherein the transparent substrate is a plastic film having a refractive index in a range of from 1.45 to 1.75.

12. The transparent conductive film according to claim 9, wherein the transparent conductive film has an in-plane retardation Re of 30 nm or less and a thickness direction retardation Rth of 100 nm or less.

13. The transparent conductive film according to claim 1, wherein the transparent conductive layer comprises a metal oxide.

14. The transparent conductive film according to claim 13, wherein the transparent substrate is a plastic film having a refractive index in a range of from 1.45 to 1.75.

15. The transparent conductive film according to claim 13, wherein the transparent conductive film has an in-plane retardation Re of 30 nm or less and a thickness direction retardation Rth of 100 nm or less.

16. The transparent conductive film according to claim 1, wherein the transparent substrate is a plastic film having a refractive index in a range of from 1.45 to 1.75.

17. The transparent conductive film according to claim 16, wherein the transparent conductive film has an in-plane retardation Re of 30 nm or less and a thickness direction retardation Rth of 100 nm or less.

18. The transparent conductive film according to claim 17, further comprising:

an organic compound layer formed on the transparent substrate opposite of the undercoat layer.

19. The transparent conductive film according to claim 1, wherein the undercoat layer comprises an organic hard coating agent including silicon.

20. The transparent conductive film according to claim 19 wherein the undercoat layer further includes at least one inorganic compound selected from the group consisting of titanium oxide, zirconium oxide, zinc sulfide, tantalum oxide, zinc oxide, indium oxide, niobium oxide, and tantalum oxide.

* * * * *